Feb. 16, 1937.  P. KRUSE  2,070,906
CAN FORMING AND SIZING MACHINE
Filed June 14, 1935  2 Sheets-Sheet 1
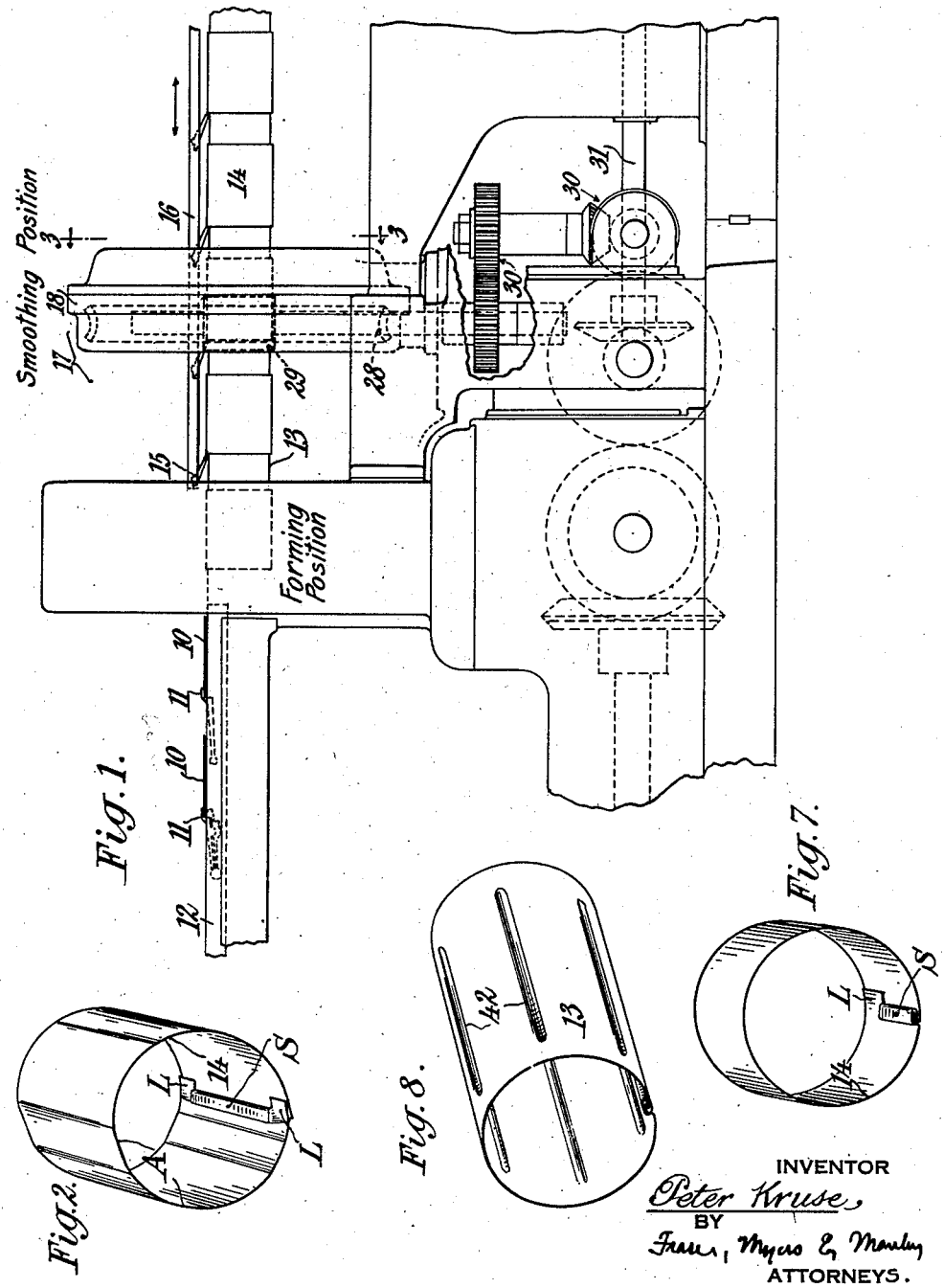
INVENTOR
Peter Kruse,
BY
ATTORNEYS.

Feb. 16, 1937. P. KRUSE 2,070,906
CAN FORMING AND SIZING MACHINE
Filed June 14, 1935 2 Sheets-Sheet 2
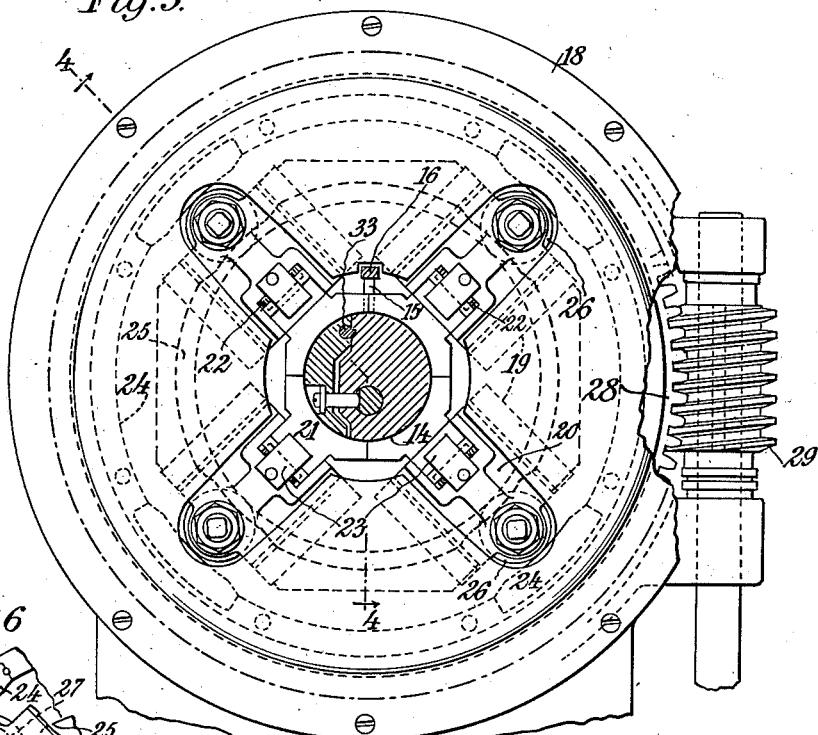
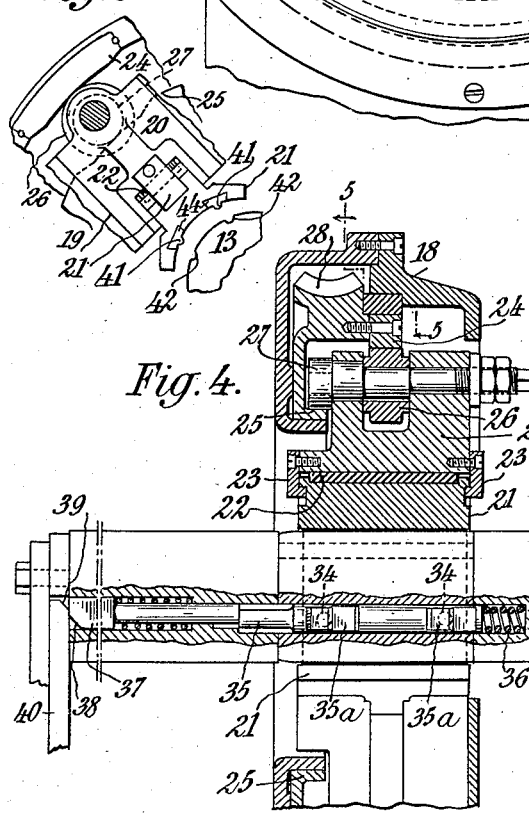
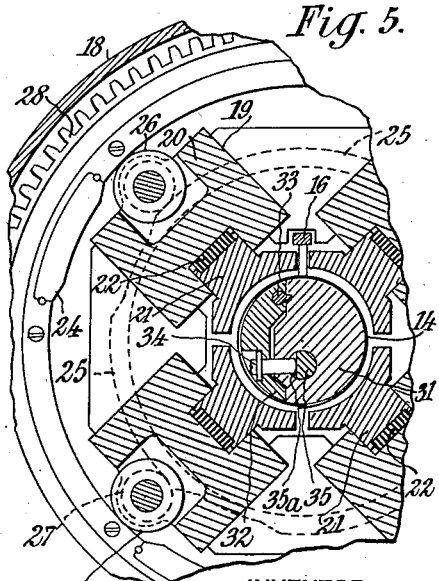
INVENTOR
Peter Kruse,
BY
Fraser, Myers & Manley
ATTORNEYS.

Patented Feb. 16, 1937

2,070,906

UNITED STATES PATENT OFFICE 2,070,906

CAN FORMING AND SIZING MACHINE

Peter Kruse, Brooklyn, N. Y., assignor to E. W. Bliss Company, Brooklyn, N. Y., a corporation of Delaware Application June 14, 1935, Serial No. 26,545

4 Claims. (Cl. 153—48)

This invention relates to the art of working sheet metal and is more particularly directed towards the manufacture of sheet metal receptacles such as tin cans.

In the commercial manufacture of such cans considerable difficulty is encountered in the production of a truly smooth can body; that is, such bodies tend to have flats or other surface irregularities. Such flats are due to the character of the metal used, and in some part, to the method of manufacture. Can bodies having these flat surfaces are objectionable to the trade because they do not present a finished appearance. However, these cans are even more objectionable because they are not sufficiently strong to withstand the crushing force incident to high vacuum packing. Further, the end laps of such cans, being unsupported, tend to spread open; and in the soldering process, as will later appear, these open laps take an excessive amount of solder. Such excess solder is not only wasteful, but it tends to weaken, rather than strengthen the body.

I am aware that this problem has been considered heretofore, and that to some extent it has been solved, as shown in Patents Nos. 1,930,562 and 1,985,039, wherein the can body is placed between a flexible roll and a non-flexible roll and the metal of the can physically worked to remove the objectionable qualities. This prior method, while it produces satisfactory can bodies, is unnecessarily expensive because it utilizes a very expensive machine; and because it is not a part of the actual can-making process but is an adjunct thereto. Further, these prior methods are useful only in the smoothing of cylindrical can bodies.

According to my present invention, I contemplate forming the cans in the usual manner and thereafter subjecting them to a die-pressing operation which will produce a can of the exact desired shape, and at the same time remove the objectionable surface irregularities.

When cans of this type are used in vacuum packing they frequently require some means for strengthening them, which in the past has been accomplished by forming beads about the periphery of the can. Such beads must be formed after the seam has been soldered; and after the ends of the body have been flanged. Otherwise the beads would be collapsed in this latter process. I propose to form a plurality of beads which extend lengthwise of the can to provide an increased strength both against circumferential and longitudinal crushing; and in accordance with the principles of my invention this may most readily be done at the same time that the can is smoothed. An additional advantage of such longitudinal beads resides in the fact that the seams of the can body may be soldered after their formation. Other objects and various features of the invention will be more apparent from the following description to be read in connection with the accompanying drawings, in which—

Figure 1 is an elevational view of part of a can-forming machine, including the smoothing and beading device of my invention;

Fig. 2 is a perspective view of a can body showing the various irregularities therein;

Fig. 3 is a fragmentary end view partially in section, taken on the line 3—3 of Fig. 1;

Fig. 4 is a fragmentary sectional view taken on the line 4—4 of Fig. 3;

Fig. 5 is a fragmentary sectional plan view taken on the line 5—5 of Fig. 4;

Fig. 6 is a fragmentary view of part of the apparatus of Fig. 4, including a modification thereof;

Fig. 7 is a perspective view of a part of a can body showing the seam and end lap thereof after it has been smoothed in accordance with this invention; and Fig. 8 is a perspective view of a can body which has been smoothed and beaded in accordance with this invention.

In general, can bodies are produced commercially by first forming a suitable sheet metal blank, thereafter turning its edges at an angle to the plane of the sheet and then wrapping the blank about a suitable mandrel or horn whereby the hooked edges are overlapped to form a seam. Thus, in Fig. 1, the blanks 10 are advanced, by means of fingers 11 which are mounted upon a reciprocatory feed bar 12, from some initial position not shown, to the forming position of Fig. 1. Suitable wing folders (not shown) then wrap the blank about the mandrel 13, and overlap its hooked edges. Thereafter the mandrel expands, and a suitable hammer bumps the overlapped edges to form a seam $S$, thus producing a can body 14 such as that shown in Fig. 2. For a more detailed description of this process which per se forms no part of the present invention reference may be had to Patent No. 1,246,437. When this forming operation is completed, the wing folders are retracted and the horn is collapsed, whereupon the can body is grasped by one of the fingers 15 of a second reciprocatory feed bar 16 which advances it along the horn for subsequent operations.

Between the forming position and the soldering position (not shown) I provide a smoothing device 17 which is adapted to die form the can body, thus removing the irregularities A (Fig. 2) and producing a substantially perfectly formed can body such as that shown in Fig. 7. This smoothing device comprises a frame 18 which is disposed about an extension of the mandrel 13 as a center. Mounted within a plurality of radial slots 19 of the frame are a plurality of slide blocks 20, to the inner end of each of which is affixed in any desired manner, a segmental die 21. Between the outer end of the die and the slide block a cushion 22 is positioned, which cushion is made of rubber, cork, or other readily deformable material. The dies are held in their proper relation to the slide blocks by means of ledge plates 23, as is best seen in Fig. 4. As here shown there are four of such dies, each of which constitutes a quarter circle, arranged complementally to form a complete circle. Obviously, any number of complemental dies might be used. Further, such dies are of a length substantially equal to the length of a can body, so that the entire can body may be squeezed between the dies and the mandrel, as will hereinafter be made clear. These dies are moved radially by means of suitable ring cams 24 and 25 which act upon the rollers 26 and 27 respectively of the slide blocks 20 in a manner which will hereinafter appear. The cams are carried by a suitable ring gear 28 which is mounted within and supported by the frame 18. The ring gear 28 is driven by a suitable worm gear 29 which is journalled in the frame and is in turn driven by suitable gear mechanism 30 from a shaft 31. Thus, as the worm gear rotates the outer cam 24 engages the roller 26 and forces the slide blocks inwardly to assume the position shown in Fig. 3. Thereafter, continued rotation causes the inner cam 25 to engage the roller 27 of the slide blocks and to lift them to the position shown in Fig. 5.

The horn, or mandrel 13, is of the expanding type and comprises a stationary part 31 to which a movable part 32 is hinged as at 33. Suitable means for spreading the two parts thereby to expand the horn are provided; and such means comprise one or more pins 34 which engage the inclined cam faces 35ª of an expander rod 35. The expander rod is slidably mounted within the stationary part 31 parallel to the axis thereof. As is best seen in Fig. 4, the right-hand end of the rod 35 abuts against a compression spring 36, whereas the left hand end thereof abuts against a suitable block 37 having a cam face 38 formed thereon. Reciprocatory motion is given to the rod 35 by the action of the cam face 39 on the vertically movable slide rod 40. Thus, when the rod 40 is raised in a suitable manner, as described in Patent No. 1,246,437, the cam face 39 engages the cam face 38 and forces the rod 35 towards the right against the action of spring 36, whereupon the inclined faces 35ª engage the end of the pin 34 and force the movable part 32 outwardly; whereas, when the slide bar 40 is retracted, spring 36 moves the rod 35 to the right and releases the movable part 32, which thereupon contracts under the tension of a spring (not shown). If desired the mandrel may be expanded throughout its entire length. More usually, however, only the portions of the mandrel at the forming and smoothing positions are expansible, both parts being expanded by the same movement of the expander rod 35. In operation a can body 14 is advanced by one of the fingers 15 of the feed bar 16 from the forming position to the smoothing position of Fig. 1. When the can reaches this position the horn is expanded, as hereinbefore described, and immediately the cam 24, which is acting in timed relation to the expansion of the horn, causes the dies to close over the outer surface of the can, as is shown in Fig. 3, the consequent shock being absorbed by the cushions 22. The can body is, of course, squeezed between the outer dies 21 and the mandrel; and the resulting product is a substantially perfect, round can, as shown in Fig. 7. As is apparent the forming mechanism and the smoothing mechanism act in timed relation to each other; that is, every time a can is formed at the forming position a similar can is being smoothed at the smoothing position. When the dies 21 are retracted and the mandrel 13 contracted, the fingers 15 again grasp the can and advance it along the horn towards a solder bath, not shown.

As is best seen in Fig. 7 the seam S of the can body comprises four thicknesses of metal which are firmly interlocked. While this seam may extend the full length of the can body it is the usual practice of can makers to provide a lap L at each end of the can. This lap comprises only two thicknesses of metal, which before soldering, are held together only by the springy character of the metal. As can best be seen in Fig. 2 the oval characteristic of unsmoothed cans tends to spread this lap; and when it is subsequently presented to the soldering machine the open lap fills with solder. Thus, these open laps use considerably more solder than is necessary to seal them; and such excess is not only wasteful, but it forms a poor bond. However, when such a can body is smoothed in accordance with my invention the die forming action tends to press the laps together, so that they do not provide an open trench in which excessive quantities of solder may accumulate.

As was hereinbefore mentioned, it is frequently desirable to provide the can with a plurality of strengthening beads. In the past such beads have been formed circumferentially of the can. While this type of bead provides adequate strength, it is objectionable because it must be formed after the can has been flanged to receive a head, and after it has been soldered. As a result, the process of forming such beads has a great tendency to break the seam and to create leaks, which means faulty cans. In accordance with my invention I contemplate forming a plurality of longitudinal beads. Such beads provide adequate strength to withstand the crushing effect of atmospheric pressure acting on a vacuum packed can; and they provide longitudinal strength to resist any crushing force due to the flanging and heading of such cans. Further, cans having longitudinal beads may be soldered after the beads have been formed. Consequently, the beading operation cannot break the soldered seam. These beads may be formed in the can in any desired manner, but in accordance with my invention this may most readily be done by forming one or more longitudinal beading dies 41 on each of the smoothing dies 21; and by forming corresponding beading dies 42 on the surface of the mandrel 31, as shown in Fig. 6. Thus, when the can is advanced to the smoothing position, the horn expanded, and the dies 21 contracted, the can will not only be smoothed as was hereinbefore mentioned, but a plurality of longitudinal beads 43 will be formed therein. Such beads may extend the entire length of the can, or to any desired lesser extent, they may be staggered, or may be formed in almost any other desired manner. If desired, the dies 41 may be formed on insets 44 which may be replaced with smooth insets when unbeaded cans are desired.

While I have shown a cylindrical horn and circular dies for smoothing and beading a round can these shapes have been selected merely because they are the easiest to illustrate. It is evident that cans of oval, square, or other odd shape can be smoothed and beaded in accordance with this invention by merely providing a mandrel and complemental dies which conform to the shape of the particular can which is being worked upon.

Since certain changes may be made in the construction without in any way departing from the general scope of the invention, it is intended that the foregoing description of the embodiment of the invention shall be construed in an illustrative rather than in a limiting sense.

What I claim is:

1. A machine for smoothing can bodies comprising a mandrel, means for positioning a can body on said mandrel, a plurality of radially movable die segments complemental to and disposed about said mandrel, each of said die segments being of a length substantially equal to the length of the can body, means for expanding the mandrel, means for closing said die segments over said mandrel whereby the entire surface of the can body may be squeezed to the shape of the mandrel and surface irregularities removed therefrom, means for retracting said dies, and means for collapsing said mandrel whereby the can body may be removed therefrom, the means for closing and retracting said die segments comprising a pair of concentrically mounted ring cams the outer of which is adapted to close and the inner of which is adapted to retract said dies.

2. A machine according to claim 1 further characterized by the provision of a plurality of radially movable slide blocks each carrying one of said die segments and each having means for engaging said ring cams; and means for continuously rotating said ring cams whereby the outer ring will force the blocks inwardly and the inner ring will force the blocks outwardly.

3. A machine according to claim 1 further characterized by the provision of a plurality of radially movable slide blocks each carrying one of the die segments upon the inner end and each having means for engaging said ring cams so as to be operated thereby, a ring gear upon which said cams are carried, and means for rotating said gear continuously in one direction whereby to effect the radial movement of said blocks and segments.

4. A machine for shaping can bodies comprising a frame, an expansible mandrel passing axially through the frame, a plurality of slide blocks which are adapted to move radially in said frame, a plurality of segmental dies disposed about said mandrel each carried upon the inner end of one of said slide blocks, a pair of rings mounted concentrically to each other within said frame, each of said rings having formed thereon at least one cam for each of the slide blocks, means on the outer end of each of said blocks for engaging each of said rings, and means for rotating said rings simultaneously and continuously in one direction whereby the cams on the outer of the rings will force the blocks radially inwardly to close the dies over said mandrel, and subsequently the cams on the inner of said rings will force the blocks radially outwardly to withdraw the dies from the mandrel; and means for expanding and contracting said mandrel in timed relation to the movements of said dies.

PETER KRUSE.